May 5, 1959     T. B. DALTON     2,885,220
SHOCK ABSORBING SUPPORT FOR SEMI-TRAILER LANDING GEAR
Filed Nov. 9, 1955     2 Sheets-Sheet 1
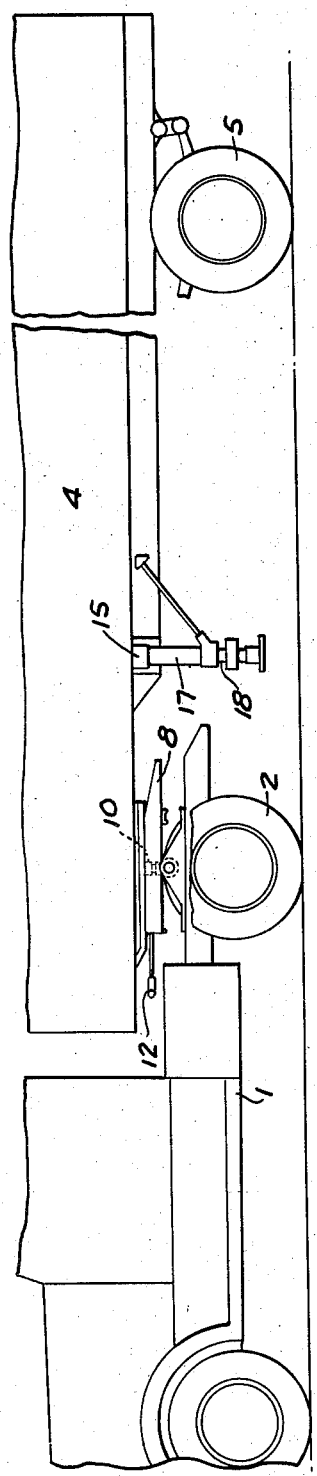
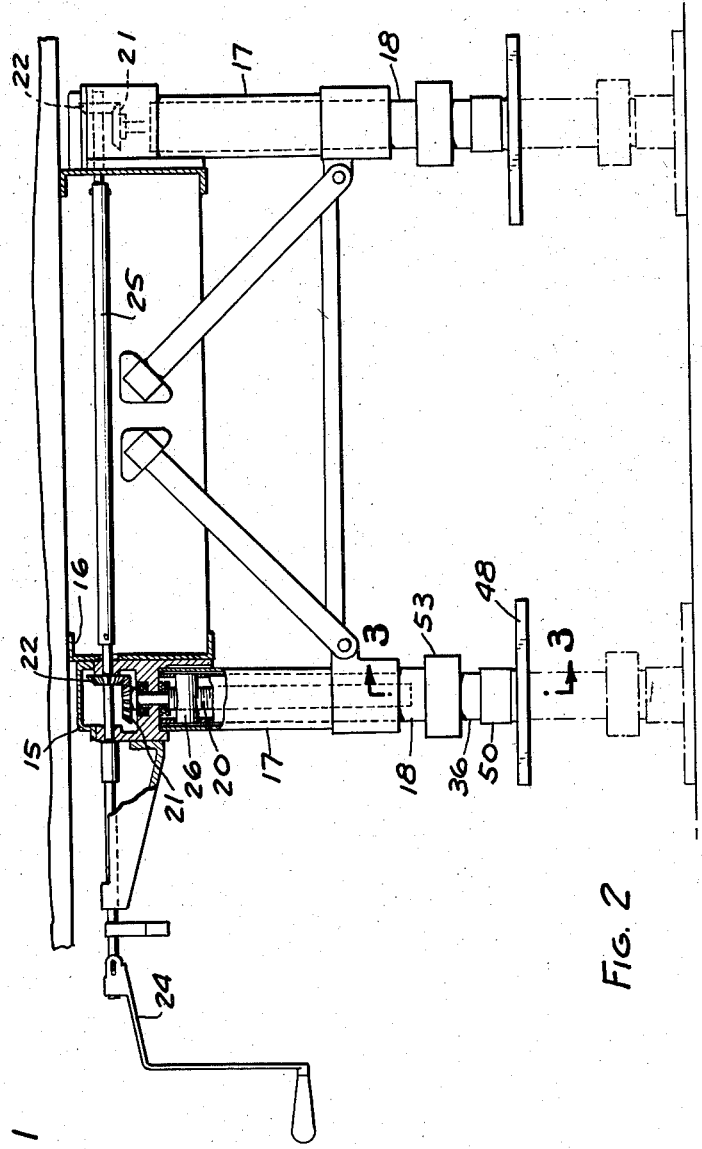
INVENTOR.
THOMAS B. DALTON
BY
ATTORNEYS.

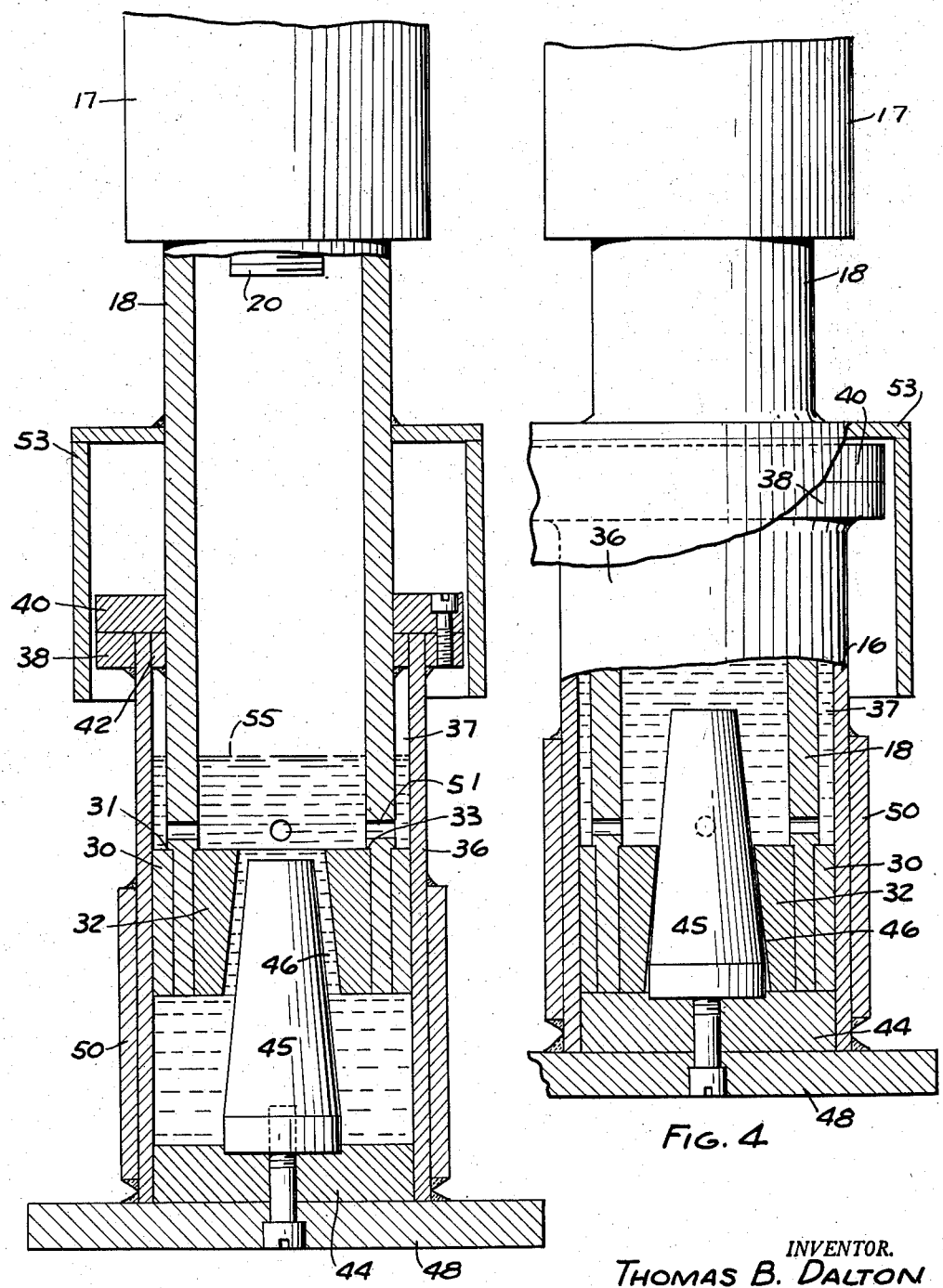

United States Patent Office 2,885,220
Patented May 5, 1959

2,885,220

SHOCK ABSORBING SUPPORT FOR SEMI-TRAILER LANDING GEAR

Thomas B. Dalton, Muskegon, Mich., assignor to West Michigan Steel Foundry Co., Muskegon, Mich., a corporation of Michigan Application November 9, 1955, Serial No. 545,917

4 Claims. (Cl. 280—150.5)

This invention relates to supporting structure or landing gear for semi-trailers.

The general structure of a semi-trailer is well known to those versed in the art, as a semi-trailer is combined with a truck or tractor thus constituting a complete vehicle unit. The semi-trailer has ground engaging wheels for supporting its rear end, whereas the front end of the semi-trailer rests upon and is supported by the truck or tractor with the weight of the semi-trailer providing traction load for the traction wheels of the tractor. The connection between the semi-trailer and the tractor is quite usually in the form of a so-called fifth wheel which embodies a lower fifth wheel member on the tractor and an upper fifth wheel member on the trailer connected as by means of a king pin so that the tractor and semi-trailer may turn angularly relatively to each other about a vertical axis. An example of such a fifth wheel connected between a tractor and semi-trailer is shown in the C. G. Seyferth Patent No. 2,469,279 of May 3, 1949.

It is quite common to couple the fifth wheel elements of the tractor and semi-trailer together in a releasable manner so that the tractor may be interchangeably used with various semi-trailers. Thus the tractor may be kept operating while semi-trailers are being loaded and unloaded. Indeed, semi-trailers have become so extensively used that they are commonly referred to as trailers.

When a tractor is uncoupled from a semi-trailer the front end of the semi-trailer is supported by a form of support or landing gear, an example of which is shown in the C. G. Seyferth Patent No. 2,523,152 of September 19, 1950. A tractor is coupled to a semi-trailer by backing the tractor under the front end so that the tractor takes the load thereof, and the landing gear or support is raised to a running position. If the tractor and semi-trailer are not properly coupled, the tractor will pull away and out from under the semi-trailer with the result that the front end of the trailer is dropped. This results in considerable damage to the trailer or landing gear or both particularly if the trailer is heavily loaded.

The object of this invention is to provide a support for the front end of a trailer to catch the load in the event the tractor moves out from under the semi-trailer, as above stated, and to gradually stop the downward movement to the end of minimizing or preventing damage. In accordance with the invention, the cushioning action is accomplished without storing up energy such as to create a rebound. In this connection it may be pointed out that resilient mechanisms embodying springs which have been tried for this purpose, but such mechanism results in storing up of energy in the springs causing rebound or bouncing oscillations which is nearly as bad as the shock of the fall without springs. The invention, accordingly, provides cushioning action by the displacement of hydraulic medium.

The invention is disclosed in the accompanying drawings.

Fig. 1 is a general view illustrating a tractor and trailer coupled together with the support for the the front end of the trailer raised to running position.

Fig. 2 is a view showing a supporting structure and with parts cut away illustrating operating mechanism.

Fig. 3 is an enlarged cross sectional view taken on line 3—3 of Fig. 2 of the structure for providing the cushioning action showing the structure in extended position.

Fig. 4 is a view similar to Fig. 3 showing the structure in collapsed position.

A tractor-semi-trailer combination, as illustrated in Fig. 1, embodies a tractor generally illustrated at 1 with traction wheels 2; the trailer body is shown at 4 with ground engaging wheels 5 at its rear end. Mounted upon the frame of the tractor is a lower fifth wheel member 8 upon which the forward end of the trailer rests. The underside of the trailer usually has a depending king pin 10 received in a socket in the lower fifth wheel 8, which socket contains coupling means for engaging the king pin, one form of which is demonstrated in the above referred to C. G. Seyferth Patent No. 2,469,279. The coupling means for engaging the king pin may be released by a suitable operating handle demonstrated in Fig. 1 at 12.

The supports or landing gear may be of the form shown in Fig. 2. There is usually a supporting strut at each side of the trailer and only one need be described, although the same reference characters are applied to both. An upper housing 15 is secured to the part of the trailer, such as the frame 16, and it has a depending hollow leg member 17. Slidable in the upper leg 17 is a lower leg member 18 which may be of tubular form. Suitably supported in the head 15 of each leg is a depending screw 20 with a gear 21 thereon, the teeth of which mesh with a gear 22 turnable by a handle 24. A shaft 25 extends across the trailer frame to interconnect the gears 21 of the respective legs. Suffice it to say that the operator may turn the handle 24 thus to rotate the screws 20, each of which functions in a nut 26 fastened to the extendable legs 18. Thus, the legs may be lowered to ground engaging position before the tractor is uncoupled from the trailer by pulling out from under it, and after a tractor has recoupled with a trailer the projecting legs 18 may be elevated to provide adequate clearance relative to the ground for the operation of the vehicle over the highways.

The construction of the supporting legs for cushioning the load by the displacement of hydraulic medium is shown in Fig. 3. The lower end of the leg 18 has on its extreme end a form of piston. This piston is conveniently formed by a ring 30 surrounding the lower end of the leg 18 and seating on a shoulder 31 and an inner ring 32 disposed within the tubular leg 18 and seating on a shoulder 33.

This piston is positioned within a cylinder 36. The interfit between the piston and the cylinder is such as to provide a nicety of sliding fit and the inner walls of the cylinder are spaced from the leg 18 to provide an area 37. A ring 38 is secured to the upper end of the cylinder and a plate 40 is secured to this ring and extends inwardly into proximity with the leg 18. The plate 40 is of washer form thus circumferentially embraces the leg 18 with adequate clearance for movement and it rests upon a projection which may be in the form of a ring 42 welded or otherwise secured to the leg 18.

The lower end of the cylinder is closed by a plate 44, mounted on which is a stud or projection 45. The projection 45 is of tapered form as indicated and the opening through the ring 32 is of tapered form. The opening in the ring 32, as indicated at 46, is a port or passage and the element 45 is a valving member for this port. A suitable ground engaging foot plate 48 is secured to the bottom of the cylinder 36. This foot plate may be arranged to directly engage the ground or it may be equipped with wheels or rollers as shown in the C. G. Seyferth Patent No. 2,523,152. The lower end of the cylinder may be reinforced by a surrounding tubular member or cylinder 50 and the tubular leg 18 is preferably provided with one or more equalizing apertures 51 for interconnecting the area within the tubular leg 18 and the area between the tubular leg 18 and the cylinder 36 above the piston.

In order to protect the upper end of the cylinder and to keep dirt and debris away from the interfaces between the plate 40 and exterior surface of the leg 18, a hood 53 may be secured to the leg portion 18 and it has a depending circumferential wall extending over the upper end of the piston structure with adequate clearance for movement of the piston. In use, a suitable quantity of hydraulic medium, such as a silicone oil is placed in the cylinder. The oil fills the cylinder below the piston and preferably an excess of oil is used to about a level as indicated at 55. Thus the oil fills the cylinder below the piston, fills the port 46 with the excess in the lower end of the hollow leg 18 and in the space 37. Sufficient excess is preferably provided so that the structure may be used over an indefinite period of time with assurance that there is adequate hydraulic medium available notwithstanding some possible loss.

In the normal running position as shown in Fig. 1, the leg 18 is elevated. The foot 48 may be elevated so that for normal running purposes it is about 12" from the ground. This, of course, is variable. When in such elevated position the cylinder and the ground engaging element gravitate downwardly relative to the leg 18 and it hangs or depends from the support 42. This is the position shown in Fig. 3.

If the trailer be dropped for any reason, as aforesaid, while the supports are elevated, the foot plates strike the ground and the piston is urged downwardly in the cylinder under the weight of the trailer. This causes a displacement of the indicated medium from the lower end of the cylinder through the port 46 and into the areas above the piston. As the piston moves down, the port 46 is ensmalled at a rate corresponding to the rate of descent of the piston in the cylinder which can be considered as gradual even though the lapse of time is short. This cushions the shock of the fall with the cushioning action or resistance to the fall increasing as the piston decelerates. In other words, the original resistance may be considered as relatively light due to the large area of the port 46. But the resistance to the fall increases during the descent. Finally, when the piston seats on the closure plate 44 descent of the trailer is stopped. At this time there is preferably a slight clearance between the member 45 and the internal walls of the port so that the port 46 is still open. The amount of this opening may be varied to meet different conditions but a clearance of about .010" has been found to be satisfactory.

When the trailer is elevated the piston again gravitates to the position shown in Fig. 3 so that it automatically sets itself to again function in cushioning a fall or drop of a trailer.

In normal use, when the support is lowered for a normal uncoupling of the tractor and trailer, an operator turns the crank to lower the leg 18 and when the foot plate 48 strikes the ground the oil is displaced from under the piston through the port 46 but this is a relatively slow movement and offers no substantial resistance which must be overcome by the operator in lowering the support. In such normal operation the supports are lowered until the piston rests upon the end plate 44. Also a normal operation is when the legs are elevated after a tractor has coupled to a trailer, the cylinder gravitates to its operating position, as shown in Fig. 3.

I claim:

1. In a trailer landing gear of the type having generally vertically extending legs and means for selectively lowering the legs generally vertically to engage the ground and support the trailer and for retracting the legs, leg structure comprising, a leg member forming a principal support for carrying the weight of a trailer when the landing gear is in trailer supporting position, said leg member having hollow tubular form adjacent its lower end, a closure secured in fixed relation to the lower end of said leg member and cooperating therewith to form a piston, a cylinder freely slidably fitting around said piston and having a closed end below the lower end of said piston, hydraulic fluid contained by said cylinder and hollow piston, said closure having an opening therein, said opening providing the sole means for passing hydraulic fluid from one side of said closure to the other side upon relative movement of said piston and cylinder, whereby to control the flow of fluid between said cylinder and piston solely by regulating the flow through said opening, a tapered metering member carried by said cylinder and being aligned for entering said opening and progressively decreasing the size thereof upon relative movement of said piston and cylinder incident to load of the trailer on said leg structure, whereby shock due to sudden load on said leg structure is absorbed by displacement of hydraulic fluid through the decreasing opening, said closed end of said cylinder being engageable against said lower end of said piston to provide rigid support for the trailer when said cylinder and piston have been relatively collapsed by the trailer load, said metering member and opening having clearance therebetween in collapsed relation of said piston and cylinder to facilitate withdrawal of said metering member relative to said opening upon relief of trailer load on said leg structure.

2. The combination defined in claim 1 wherein said opening has a generally uniform taper between its ends and said metering member has a generally uniform taper generally complementary to the taper of said opening.

3. The combination defined in claim 1 wherein, in said collapsed relative positions of said piston and cylinder, substantially all of said fluid is contained within portions of said piston so that said closed end of said cylinder and said lower end of said piston interengage over major portions of their areas.

4. The combination defined in claim 1 wherein said leg member and cylinder have external slidably interengaging means limiting relative extending movement thereof, and a hood on said leg member having a depending flange surrounding said interengaging means in all relative positions of said leg member and cylinders.

References Cited in the file of this patent
UNITED STATES PATENTS

| | | |
|---|---|---|
| 1,891,517 | Williams | Dec. 20, 1932 |
| 2,039,135 | Waugh | Apr. 28, 1936 |
| 2,439,349 | Tack et al. | Apr. 6, 1948 |
| 2,523,152 | Seyferth | Sept. 19, 1950 |